(12) United States Patent
Wakabayashi

(10) Patent No.: US 10,246,597 B2
(45) Date of Patent: Apr. 2, 2019

(54) OIL-BASED RECORDING LIQUID

(71) Applicant: Seiko Epson Corporation, Tokyo (JP)

(72) Inventor: Shigemi Wakabayashi, Azumino (JP)

(73) Assignee: Seiko Epson Corporation (JP)

(*) Notice: Subject to any disclaimer, the term of this patent is extended or adjusted under 35 U.S.C. 154(b) by 178 days.

(21) Appl. No.: 15/338,788

(22) Filed: Oct. 31, 2016

(65) Prior Publication Data

US 2017/0121546 A1 May 4, 2017

(30) Foreign Application Priority Data

| Nov. 2, 2015 | (JP) | 2015-215559 |
| Nov. 2, 2015 | (JP) | 2015-215560 |
| Sep. 1, 2016 | (JP) | 2016-170572 |

(51) Int. Cl.
| *C09D 11/36* | (2014.01) |
| *C09D 11/322* | (2014.01) |
| *C09D 11/328* | (2014.01) |
| *C09D 11/38* | (2014.01) |

(52) U.S. Cl.
CPC ............ *C09D 11/36* (2013.01); *C09D 11/322* (2013.01); *C09D 11/328* (2013.01); *C09D 11/38* (2013.01)

(58) Field of Classification Search
CPC ..... C09D 11/36; C09D 11/322; C09D 11/328; C09D 11/107; C09D 11/38

USPC ......................................................... 524/853
See application file for complete search history.

(56) References Cited

U.S. PATENT DOCUMENTS

| 2008/0125511 A1* | 5/2008 | Nakano ................ C09D 11/101 522/181 |
| 2009/0110843 A1* | 4/2009 | Halahmi .............. C09D 11/101 427/511 |

FOREIGN PATENT DOCUMENTS

| CN | 101250354 A | * | 8/2008 |
| JP | 2004-217703 A | | 8/2004 |
| JP | 2009-275211 A | | 11/2009 |
| JP | 2013-047289 A | | 3/2013 |
| JP | 2013-166813 A | | 8/2013 |

OTHER PUBLICATIONS

CN 101250354 A,, machine translation, Google Patents. (Year: 2008).*

* cited by examiner

*Primary Examiner* — Josephine L Chang
(74) *Attorney, Agent, or Firm* — Harness, Dickey & Pierce, P.L.C.

(57) ABSTRACT

An oil-based recording liquid according to the invention includes a color material and an oil-based medium, the oil-based medium contains a first organic medium having an SP value of 9.5 or more and an iodine value of 120 or more, and the content of the first organic medium is 50 percent by mass or more, or the oil-based medium contains an allyl compound.

8 Claims, No Drawings

OIL-BASED RECORDING LIQUID

BACKGROUND

1. Technical Field

The present invention relates to an oil-based recording liquid.

2. Related Art

Development of an office-use ink jet printer has been carried out. The office-use printer is required to perform high-speed printing on a recording medium, such as normal paper, with a high quality and is also required to cooperate with a finisher used for bookbinding after printing. Accordingly, as characteristics required for a recording liquid to be used for this printer, to secure a high print density on normal paper at a high printing rate, to suppress strike through so that two-sided printing can be performed, and furthermore, to generate no paper deformation, such as cockling or curling, are required. When an aqueous recording liquid containing an aqueous medium is used as an ink, after a high-speed printing is performed on normal paper, paper deformation, such as cockling and/or curling, may occur in some cases; hence, development of an oil-based recording liquid which is not likely to cause paper deformation and which contains an oil-based medium has also been carried out.

As an oil-based medium to be used for an oil-based recording liquid, when a volatile organic compound is employed, by emission of the volatile organic compound to the environment, health hazards, such as allergy, may occur in some cases. Hence, as the medium to be used for an oil-based recording liquid, a low volatile organic compound has been employed. However, when printing is performed using an oil-based recording liquid containing a low volatile organic compound as the medium, since having a low volatile property, the medium remains in and infiltrates into a recording medium, strike through and bleeding may occur, and the print density may be decreased from the start of printing in some cases. In addition, when a recording medium on which printing is performed using an oil-based recording liquid is pinched by a clear folder formed of a polypropylene (PP), since the oil-based medium moves to the clear folder, the inside thereof is only expanded, and the clear folder may be deformed in some cases so as to be warped toward the outside, undulated, or the like. In particular, when a record material in which recording is performed on a recording medium at a high duty is pinched by a clear folder, the clear folder is remarkably warped toward the outside, and the use thereof may cause a problem in some cases.

Hence, in order to overcome the problem as described above, the deformation of a clear folder is suppressed in such a way that a medium movement from a recording medium to a clear folder is suppressed by increasing the viscosity of a recording liquid, and in addition, by selection of an oil-based medium having a high polarity, an attack property to the clear folder is reduced (for example, see JP-A-2009-275211). In this case, as the medium, a diester of a polyalcohol and a branched aliphatic carboxylic acid or a diester of a branched aliphatic alcohol and a higher aliphatic carboxylic acid is used.

SUMMARY

However, when the viscosity of the recording liquid and the polarity of the medium are excessively high, an ejection property of the recording liquid and the adhesion between record materials which are laminated and stored may become problems; hence, the deformation of a clear folder can be suppressed only for a short period of time, such as up to approximately 10 days, and the suppression effect is not sufficient. As described above, the deformation of a clear folder caused by a record material using an oil-based recording liquid is difficult to be suppressed for a long period of time.

An advantage of some aspects of the invention is to provide an oil-based recording liquid which can improve a clear folder storage property of a record material for a long period of time by at least partially solve the problem described above.

The invention was made by at least partially solve the problem described above and can be realized as the following aspects or application examples.

Application Example 1

An oil-based recording liquid according to one aspect of the invention comprises a color material and an oil-based medium, the oil-based medium contains a first organic medium having an SP value of 9.5 or more and an iodine value of 120 or more, and the content of the first organic medium is 50 percent by mass or more.

According to the above application example, since the content of the first organic medium having an SP value of 9.5 or more and an iodine value of 120 or more is 50 percent by mass or more, even if the viscosity of an ink is low before recording, the ink after the recording has a high viscosity because of rapid curing, and as a result, the oil-based medium contained in the ink is fixed in a recording medium. Accordingly, an oil-based recording liquid which can suppress the deformation of a clear folder for a long period of time and which can also improve a clear folder storage property for a long period of time can be provided.

Application Example 2

An oil-based recording liquid according to another aspect of the invention comprises a color material and an oil-based medium, and the oil-based medium contains an allyl compound.

According to the above application example, since the oil-based medium contains the allyl compound, even if an ink has a low viscosity before recording, the ink after recording has a high viscosity by rapid curing, and as a result, the oil-based medium contained in the ink is fixed in a recording medium. Accordingly, an oil-based recording liquid which can suppress the deformation of a clear folder for a long period of time and which can also improve a clear folder storage property for a long period of time can be provided.

Application Example 3

In the above application example, the content of a second organic medium having an SP value of 9.0 or less and an iodine value of 100 or more, in the oil-based recording liquid is 30 percent by mass or less.

According to the above application example, since the content of the second organic medium having an SP value of 9.0 or less and an iodine value of 100 or less is 30 percent by mass or less, curing of the ink after recording is further promoted. Accordingly, even if a record material is pinched by a clear folder, the oil-based medium is suppressed from moving to the clear folder, and as a result, an oil-based recording liquid having an improved clear folder storage property can be provided.

Application Example 4

In the above application example, the oil-based recording liquid may further comprise at least one type selected from the group consisting of a metal soap and a metal complex.

According to the above application example, since the metal soap and the metal complex each function as an oxidizing agent promoting an oxidation polymerization of an organic compound contained in the oil-based medium, curing of the ink after recording is promoted. As a result, the oil-based medium contained in the ink is rapidly fixed in a recording medium, and an oil-based recording liquid having an improved clear folder storage property can be provided.

Application Example 5

In the above application example, a metal contained in the metal soap or the metal complex may be at least one type selected from the group consisting of Co, Mn, Pb, Zr, Ca, Ba, K, and Fe.

According to the above application example, since the above metal is contained, the oxidation polymerization of the organic compound contained in the oil-based medium is further promoted, and curing of the ink after recording is further promoted. As a result, the oil-based medium contained in the ink is rapidly fixed in a recording medium, so that an oil-based recording liquid having an improved clear folder storage property can be provided.

Application Example 6

In the above application example, the oil-based medium may further contain a dry oil.

According to the above application example, since the dry oil is contained, the oxidation polymerization of the ink is promoted, and curing thereof is promoted, so that the ink after recording is fixed. As a result, even when a record material is pinched by a clear folder, a remaining medium is suppressed from moving to the clear folder, and an oil-based recording liquid having an improved clear folder storage property can be provided.

Application Example 7

In the above application example, the allyl compound may be a compound represented by the following formula (1).

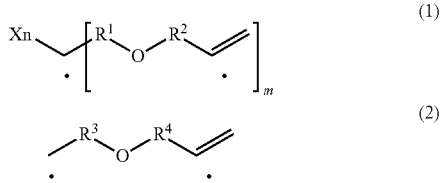

In the formula (1), $R^1$ and $R^2$ each independently represent an alkyl chain having 1 to 3 carbon atoms, $X_n$ represents hydrogen, a hydroxyl group, an alkyl group having 1 to 6 carbon atoms, an alkylol group having 1 to 3 carbon atoms, or an allylalkoxy alkyl group represented by a formula (2).

m represents an integer of 1 to 3, and n represents an integer which satisfies m+n=4. $R^3$ and $R^4$ in the formula (2) each independently represent an alkyl chain having 1 to 3 carbon atoms.

According to the above application example, since the allyl compound is a compound represented by the formula (1), the reactivity is further improved, and curing of the ink is promoted, so that the oil-based medium contained in the ink is fixed in a recording medium. As a result, an oil-based recording liquid having an improved clear folder storage property can be provided.

Application Example 8

In the above application example, the oil-based recording liquid may be used for ink jet recording.

According to the above application example, the oil-based recording liquid can be preferably used as an ink jet recording liquid, and an oil-based recording liquid for ink jet recording can be provided which can suppress the movement of a remaining medium to a clear folder even if a record material obtained therefrom is pinched by a clear folder, and which can improve a clear folder storage property.

DESCRIPTION OF EXEMPLARY EMBODIMENTS

Hereinafter, preferable embodiments of the invention will be described. The following embodiments each explain one example of the invention. In addition, the invention is not limited to the following embodiments and may include various modification examples performed without departing from the scope of the invention.

1. Oil-Based Recording Liquid

An oil-based recording liquid according to this embodiment includes a color material and an oil-based medium, the oil-based medium contains a first organic medium having an SP value of 9.5 or more and an iodine value of 120 or more, and the content of the first organic medium is 50 percent by mass or more, or the oil-based medium contains an allyl compound. When being an oil-based recording liquid containing a color material and an oil-based medium, the oil-based recording liquid according to the invention may be used as an oil paint, a paint, an ink for a writing material, such as a fountain pen, or a printing ink without any particular restriction.

Incidentally, the "oil-based recording liquid" of the present specification indicates a recording liquid containing an oil-based medium as a primary component and indicates a recording liquid containing substantially no water. In addition, "containing substantially no water" indicates that when a recording liquid is manufactured, water is not intentionally added, but a small amount of moisture inevitably mixed in manufacturing or storing of a recording liquid may be contained.

In addition, as for a concrete water content of the "oil-based recording liquid containing substantially no water", the content of water in the oil-based recording liquid is preferably 3 percent by mass or less, more preferably 1 percent by mass or less, further preferably less than 0.05 percent by mass, particularly preferably less than 0.01 percent by mass, further particularly preferably less than 0.005 percent by mass, and most preferably less than 0.001 percent by mass.

Hereinafter, in this embodiment, the case in which the oil-based recording liquid is used as an oil-based ink jet ink composition (hereinafter, simply referred to as "ink" in some cases) for ink jet recording will be described by way of example, and components contained in the oil-based ink jet ink composition and components which may be contained therein will be described.

1.1. Color Material

The oil-based ink jet ink composition according to this embodiment includes a color material. As the color material, an oil-based dye or a pigment, such as a colored inorganic pigment or a colored organic pigment, each of which has been generally used for a related oil-based ink jet ink composition, may be used. Those color materials may be used alone, or at least two types thereof may be used in combination.

When the pigment is used, a related known inorganic pigment or organic pigment may be used without any particular restriction as long as the average particle diameter of a pigment dispersion in a recording liquid is from 20 to 200 nm, and the hue of the pigment is black, yellow, magenta, cyan, red, green, blue, or orange.

As the pigment described above, for example, there may be mentioned an azo pigment, such as an azo lake, an insoluble azo pigment, a condensed azo pigment, or a chelate azo pigment; a polycyclic pigment, such as a phthalocyanine pigment, perylene and a perylene pigment, an anthraquinone pigment, a quinacridone pigment, a dioxazine pigment, a thioindigo pigment, an isoindolinone pigment, or a quinophthalone pigment; a dye lake, such as a basic dye type lake or an acidic dye type lake; an organic pigment, such as a nitro pigment, a nitroso pigment, an aniline black, or a day-light fluorescent pigment; or an inorganic pigment, such as carbon black.

In more particular, as a pigment which enables the oil-based ink jet ink composition according to this embodiment to be used as a magenta or a red recording liquid, for example, there may be mentioned C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 170, C.I. Pigment Red 177, C.I. Pigment Red 178, C.I. Pigment Red 194, C.I. Pigment Red 209, C.I. Pigment Red 222, C.I. Pigment Red 224, or C.I. Pigment Violet 19.

As a pigment which enables the oil-based ink jet ink composition according to this embodiment to be used as a orange or a yellow recording liquid, for example, there may be mentioned C.I. Pigment Orange 31, C.I. Pigment Orange 43, C.I. Pigment Orange 64, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 150, or C.I. Pigment Yellow 180.

As a pigment which enables the oil-based ink jet ink composition according to this embodiment to be used as a green or a cyan recording liquid, for example, there may be mentioned C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, C.I. Pigment Green 7, or C.I. Pigment Green 36.

As a pigment which enables the oil-based ink jet ink composition according to this embodiment to be used as a black recording liquid, for example, there may be mentioned carbon black.

As a pigment which enables the oil-based ink jet ink composition according to this embodiment to be used as a white recording liquid, for example, there may be mentioned C.I. Pigment White 6, C.I. Pigment White 18, or C.I. Pigment White 21.

As a commercially available black pigment, for example, there may be preferably mentioned Carbon Black MA11, MA100, MA220, MA600a, #40, or #44 (each manufactured by Mitsubishi Chemical Corp.). In addition, as other pigments other than the black color, for example, there may be mentioned SYMULER Brilliant Carmine 6B, SYMULER Red, FASTOGEN Super Magenta, SYMULER Fast Yellow, FASTOGEN Blue 4RO-2, FASTOGEN Green, or FASTOGEN Super Violet. Those pigments may be used alone, or at least two types thereof may be appropriately used in combination.

Although the content of the pigment in the oil-based ink jet ink composition according to this embodiment may be appropriately selected in accordance with its application and/or printing characteristics, since excellent concealing property and color reproducibility can be obtained, the content with respect to the total mass (100 percent by mass) of the ink is preferably from 0.01 to 20 percent by mass, more preferably from 0.5 to 15 percent by mass, and particularly preferably from 1 to 10 percent by mass.

The average particle diameter of the pigment is preferably from 20 to 200 nm as described above. When the average particle diameter is 20 nm or more, since the chromogenic property is further improved, the oil-based ink jet ink composition is likely to be used as an ink jet recording liquid. On the other hand, when the average particle diameter is 200 nm or less, this oil-based ink jet ink composition is likely to be used by an ink jet method. In addition, when the oil-based recording liquid is used as an ink jet recording liquid, the average particle diameter described above is more preferably from 50 to 150 nm since excellent storage stability, ejection stability, and precipitation property are obtained.

Incidentally, the "average particle diameter" described in the present specification indicates a sphere-converted 50%-average particle diameter (d50) obtained by a light scattering method performed on the ink. The "sphere-converted 50%-average particle diameter (d50)" is a value obtained as described below. Light is irradiated on particles in an oil-based medium, and by detectors arranged at a front position, side positions, and a rear portion of the oil-based medium, diffraction scattered light rays thus generated are measured. By the use of the measurement values thus obtained, after the particles which inherently have irregular shapes are assume to have spherical shapes, the total volume of a particle group of spheres having the same volume as that of the above particles is set to 100%, and an accumulation curve is obtained. Subsequently, a point at which the accumulation value is 50% is regarded as the above 50%-average particle diameter (d50).

When the pigment is used as the color material, in order to improve the dispersion stability of the pigment in the oil-based ink jet ink composition, an arbitrary dispersant used for a general oil-based ink jet ink composition may be used. Although a pigment dispersant usable in the invention is not particularly limited as long as capable of stably dispersing the pigment in a solvent, for example, there may be mentioned Solsperse 5000, Solsperse 13940, Solsperse 11200, Solsperse 21000, or Solsperse 28000 (each manufactured by Lubrizol Japan Ltd.).

In the oil-based ink jet ink composition according to this embodiment, although the content of the dispersant may be appropriately selected in accordance with a pigment to be dispersed, with respect to 100 parts by mass of the content of the pigment in the oil-based ink jet ink composition, the content of the dispersant is preferably from 5 to 200 parts by mass and more preferably from 30 to 120 parts by mass.

As a commercially available dye used for the oil-based ink jet ink composition according to this embodiment, for example, there may be preferably mentioned vaLifast Black 3810, elixa Black 846, OIL BLACK HBB, or OIL BLACK No. 5, each of which is manufactured by Orient Chemicals Industries Co., Ltd. In addition, as a dye other than the black color, for example, there may be mentioned OIL BLUE 2N, elixa Orange-240, VALIFAST BLUE 1603, elixa Green-502, VALIFAST ORANGE 1201, OIL GREEN 530, elixa Green-540, OIL YELLOW GG-S, elixa Yellow-129, or VALIFAST YELLOW 1101. Those dyes may be used alone, or at least two types thereof may be appropriately used in combination.

1.2. Oil-Based Medium

The oil-based ink jet ink composition according to this embodiment contains an oil-based medium. The "oil-based medium" described in the present specification indicates a liquid medium at a normal temperature and a normal pressure which disperses a color material, such as a pigment, and which contains an organic medium (organic solvent). In addition, when the oil-based medium is an organic medium-containing material formed of a mixture of an organic medium and a material other than the organic medium, the content of the organic medium is more than 5 percent by mass.

As the oil-based medium used in the oil-based ink jet ink composition according to this embodiment, various known vegetable oils and/or petroleum solvents may be used, and a non-polar organic solvent and/or a polar organic solvent may also be used. Hereinafter, the oil-based medium contained in the oil-based ink jet ink composition according to this embodiment will be described in more detail.

1.2.1. First Organic Medium

In a preferable embodiment of the invention, as the oil-based medium, a first organic medium having an SP value of 9.5 or more and an iodine value of 120 or more is contained, and the content of this first organic medium is 50 percent by mass or more.

The content of the oil-based medium in the oil-based ink jet ink composition according to this embodiment is with respect to the total mass (100 percent by mass) of the ink composition, 50 percent by mass or more, preferably 70 percent by mass or more, and more preferably 80 percent by mass or more.

Incidentally, the SP value indicates the solubility parameter and is, for example, obtained by Fedors's calculation method described in "Research of Paint, No. 152 (2010), p. 43". The iodine value is a value which is obtained, for example, by a method defined by "JIS K 3331: 2009, Hardened oils and fatty acids for industrial use".

Since the first organic medium having an SP value of 9.5 or more and an iodine value of 120 or more has a high SP value, the attack property thereof to PP is low, and since many double bonds are contained in its molecular structure, the rate of the oxidation polymerization of the ink is high. Hence, when the ink according to this embodiment is used, the ink after recording is rapidly cured, and the oil-based medium contained therein is fixed in a recording medium. Accordingly, even if a record material is pinched by a clear folder, the oil-based medium is suppressed from moving to the clear folder, and as a result, an oil-based recording liquid having an improved clear folder storage property can be provided.

In the first organic medium described above, the upper limit of the SP value and that of the iodine value are not particularly limited. In addition, as the first organic medium, for example, there may be mentioned an allyl compound having an SP value of 9.5 or more and an iodine value of 120 or more or an ester which is formed of an alcohol and a dry oil fatty acid containing an unsaturated fatty acid and which has a SP value of 9.5 or more and an iodine value of 120 or more.

1.2.1.1. Allyl Compound

As the allyl compound having an SP value of 9.5 or more and an iodine value of 120 or more, for example, a compound represented by the following formula (3) may be mentioned.

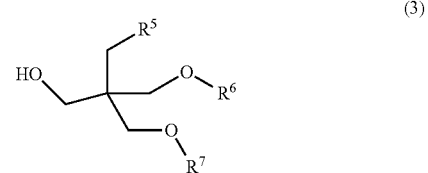

(3)

In the formula (3), $R^5$ represents a methyl group or $-OCH_2CHCH_2$, $R^6$ and $R^7$ each independently represent $(CH_2)_n CHCHR^8$, n represents an integer of 1 to 20, $R^8$ represents H, an alkyl group having 1 to 8 carbon atoms, or an aryl group having 6 to 8 carbon atoms.

As the "alkyl group having 1 to 8 carbon atoms" represented by $R^8$, a linear or a branched alkyl group may be mentioned, and for example, a methyl group, an ethyl group, a n-propyl group, an isopropyl group, a n-butyl group, a sec-butyl group, a tert-butyl group, a n-pentyl group, an isopentyl group, a tert-pentyl group, a n-hexyl group, an isohexyl group, a sec-hexyl group, a n-heptyl group, an isoheptyl group, a sec-heptyl group, a tert-heptyl group, a n-octyl group, an isooctyl group, a sec-octyl group, a tert-octyl group, or a dimethylhexyl group may be mentioned. As the aryl group having "6 to 8 carbon atoms", for example, a phenyl group, a tolyl group, a xylyl group may be mentioned.

As the allyl compound having an SP value of 9.5 or more and an iodine value of 120 or more, among the compounds each represented by the above formula (3), the compounds represented by the following formulas (4) and (5) are preferable.

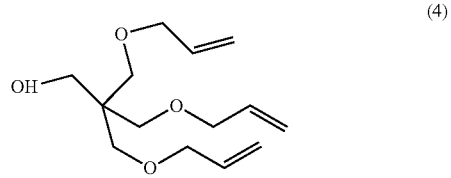

(4)

-continued

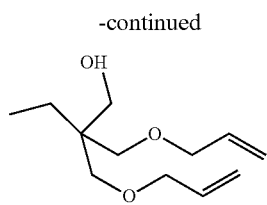

(5)

As commercially available products of the compound (SP value: 12.6, iodine value: 297) represented by the above formula (4) and the compound (SP value: 11.5, iodine value: 231) represented by the above formula (5), for example, Neoallyl (registered trade name) P-30 and Neoallyl (registered trade name) T-20 (each manufactured by Osaka Soda Co., Ltd.) may also be used.

The above allyl compounds may be used alone, or at least two types thereof may be used in combination.

1.2.1.2. Ester of Dry Oil Fatty Acid and Alcohol

Since the ester of a dry oil fatty acid and an alcohol has a low viscosity, even when a large amount thereof is used for an ink jet recording ink, no problems relating to the ejection property occur. In addition, since the above ester has a low attack property to PP which is a material of a clear folder and also contains many double bonds, the oxidation polymerization of the ink is promoted. Hence, when the ester is used as the oil-based medium of the oil-based recording liquid according to this embodiment, although the ink has a low viscosity before recording, the ink after the recording is rapidly cured and has a high viscosity, and the oil-based medium contained in the ink is fixed in a recording medium. Accordingly, even when a record material is pinched by a clear folder, the oil-based medium is suppressed from moving to the clear folder, and as a result, an oil-based recording liquid having an improved clear folder storage property can be provided.

As the ester of a dry oil fatty acid and an alcohol, any ester may be used without any restriction as long as having an SP value of 9.5 or more and an iodine value of 120 or more. The dry oil fatty acid used as a raw material of the above ester is obtained by hydrolysis of a dry oil. As the dry oil, as described below, for example, a linseed oil, a wood oil, a mustard oil, a beefsteak plant oil, a walnut oil, a perilla oil, a safflower oil, or a sunflower oil may be mentioned. As a hydrolysis method of the dry oil, a known method may be used for manufacturing.

The alcohol used as a raw material of the above ester may be an unsaturated alcohol, and the number of carbon atoms thereof may not be particularly limited. However, after recording is performed, the ester on a recording medium is liable to be immediately hydrolyzed, and an alcohol generated thereby may move to a clear folder in some cases. In this case, when the number of carbon atoms of the alcohol is 3 or less, the alcohol is likely to be vaporized, and even if a solvent remaining in a record material moves to a clear folder, and the clear folder is deformed thereby, the deformation thereof tends to be recovered. However, before the solvent moves, the oxidation polymerization of the ink is preferably completed so as not to allow the alcohol generated by the decomposition to move to a clear folder. Hence, a metal soap and/or a metal complex, which will be described later, is preferably used together with the ester so as to promote the curing.

On the other hand, when the number of carbon atoms of the alcohol is 4 or more, since being not likely to be liable to move to a clear folder. In addition, when a metal soap and/or a metal complex is contained in the ink, since a hydrolysis reaction of the above ester is promoted, a metal soap and/or a metal complex is preferably not contained in the ink.

A method for manufacturing a dry oil fatty acid ester is not particularly limited, and manufacturing thereof may be performed using a known method; however, for example, by the methods disclosed in JP-A-2005-53871, 2009-203343, and 2011-99009, manufacturing may be performed.

When the ester of a dry oil fatty acid and an alcohol is used, in view of the ejection property of the ink, the content of the ester is with respect to the total mass of the oil-based ink jet ink composition, preferably 80 percent by mass or more and more preferably 90 percent by mass or more.

As the ester of a dry oil fatty acid and an alcohol, for example, there may be mentioned a linseed oil fatty acid 2-ethylhexyl ester or a linseed oil fatty acid methyl ester. As the examples of the composition of those esters, the linseed oil fatty acid 2-ethylhexyl ester contains 61% of 2-ethylhexyl linolenate (SP value: 9.5, iodine value: 195), 14% of 2-ethylhexyl oleate (SP value: 8.6, iodine value: 64), 15% of 2-ethylhexyl linoleate (SP value: 8.5, iodine value: 129), 7% of 2-ethylhexyl palmitate (SP value: 8.5, iodine value: 0), and 3% of 2-ethylhexyl stearate (SP value: 8.5, iodine value: 0), and the linseed oil fatty acid methyl ester contains 61% of methyl linolenate (SP value: 9.6, iodine value: 267), 14% of methyl oleate (SP value: 8.6, iodine value: 94), 15% of methyl linoleate (SP value: 8.6, iodine value: 189), 7% of methyl palmitate (SP value: 8.6, iodine value: 0), and 3% of methyl stearate (SP value: 8.6, iodine value: 0). However, the composition of the ester is not limited to those mentioned above. As described above, the composition of the ester of a dry oil fatty acid and an alcohol corresponds to the fatty acid composition of a dry oil fatty acid to be used.

1.2.2. Allyl Compound

As a preferable embodiment of the invention, besides the example of the oil-based medium in which the first organic medium having an SP value of 9.5 or more and an iodine value of 120 or more is contained, and the content thereof is 50 percent by mass or more, an example in which as the oil-based medium, an allyl compound is contained may also be mentioned. In this case, depending on the reactivity of the allyl compound, the SP value and the iodine values are not always required to be 9.5 or more and 120 or more, respectively.

The allyl compound is likely to perform a cross-linking reaction at its a carbon position. Hence, when the allyl compound is contained as the oil-based medium, the oxidation polymerization of the ink is promoted on a recording medium after recording. As a result, by the use of the ink according to this embodiment, although the viscosity thereof is low before recording, the ink after recording is rapidly cured to form a highly viscous material, and the oil-based medium contained in the ink is fixed in the recording medium. Hence, even when a record material is pinched by a clear folder, the oil-based medium is suppressed from moving to the clear folder, and an oil-based recording liquid having an improved clear folder storage property can be provided.

Although the allyl compound is not particularly limited, an allyl compound having a high reactivity and a low attack property to PP is preferable.

Among allyl compounds, in view of the reactivity, an allyl ether is preferable, and the compound represented by the following formula (1) is preferable.

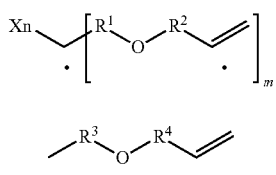

(1)

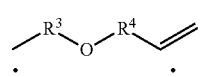

(2)

In the formula (1), $R^1$ and $R^2$ each independently represent an alkyl chain having 1 to 3 carbon atoms, Xn represents hydrogen, a hydroxyl group, an alkyl group having 1 to 6 carbon atoms, an alkylol group having 1 to 3 carbon atoms, or an allylalkoxy alkyl represented by the formula (2). m represents an integer of 1 to 3, and n represents an integer that satisfies m+n=4. In the formula (2), $R^3$ and $R^4$ each independently represents an alkyl chain having 1 to 3 carbon atoms.

Since the compound represented by the formula (1) contains many double bonds in its molecule, the reactivity thereof is high, the curing of the ink is promoted by promotion of the oxidation polymerization thereof, and the oil-based medium contained in the ink is fixed in a recording medium. As a result, an oil-based recording liquid having an improved clear folder storage property can be provided.

As the "alkyl chain group having 1 to 3 carbon atoms" represented by each of $R^1$ and $R^2$, a linear or a branched alkyl group may be mentioned, and for example, a methyl group, an ethyl group, a n-propyl group, or an isopropyl group may be mentioned. In addition, as the "alkyl group having 1 to 6 carbon atoms" represented by Xn, a linear or a branched alkyl group may be mentioned, and for example, a methyl group, an ethyl group, a n-propyl group, an isopropyl group, a n-butyl group, a sec-butyl group, a tert-butyl group, a n-pentyl group, an isopentyl group, a tert-pentyl group, a n-hexyl group, an isohexyl group, or a sec-hexyl group may be mentioned. As the "alkylol group having 1 to 3 carbon atoms", for example, a methylol group, an ethylol group, or a propyol group may be mentioned.

As the allyl compound, among the compounds each represented by the above formula (1), in particular, the compounds represented by the following formulas (4) to (6) are preferable.

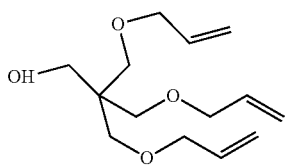

(4)

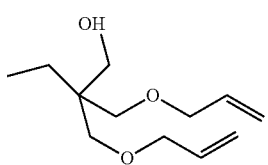

(5)

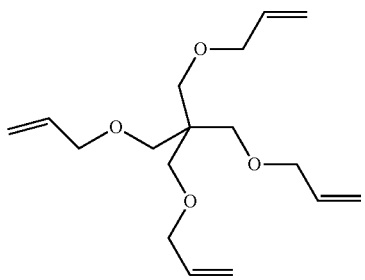

(6)

As commercially available products of the compound (SP value: 12.6, iodine value: 297) represented by the above formula (4), the compound (SP value: 11.5, iodine value: 231) represented by the above formula (5), and the compound (SP value: 8.5, iodine value: 343) represented by the above formula (6), for example, Neoallyl P-30, Neoallyl T-20, and Neoallyl P-40 (each of which is manufactured by Osaka Soda Co. Ltd.) may be used.

The above allyl compounds may be used alone, or at least two types of them may be used in combination.

The allyl compound is preferably a primary component of the oil-based medium, and the content thereof is with respect to the total mass of the oil-based ink jet ink composition, preferably 50 percent by mass or more, more preferably 60 percent by mass or more, and further preferably 80 percent by mass or more.

1.2.3. Second Organic Medium

In the oil-based ink jet ink composition according to this embodiment, as the oil-based medium, the content of a second organic medium having an SP value of 9.0 or less and an iodine value of 100 or less is preferably 30 percent by mass or less.

The above second organic medium may degrade the clear folder storage property in some cases, and since the number of the double bonds thereof is small, the oxidation polymerization of the ink will take a time. Hence, the second organic medium is preferably not contained in the ink according to this embodiment, and even if the second organic medium is contained, the content thereof is preferably 30 percent by mass or less, more preferably 20 percent by mass or less, and further preferably 10 percent by mass or less.

In addition, as the oil-based medium, the content of an organic medium having an SP value of more than 9.0 to less than 9.5 and an iodine value of more than 100 to less than 120 is preferably 50 percent by mass or less and more preferably 30 percent by mass or less.

1.2.4. Dry Oil

In the oil-based ink jet ink composition according to this embodiment, the oil-based medium preferably contains a dry oil. Since the dry oil has a high viscosity, when a large amount thereof is used for an ink jet recording ink, the ejection property may be disadvantageously degraded in some cases; however, since the dry oil has a low attack property to PP which is a material of a clear folder, and many double bonds are contained therein, the oxidation polymerization of the ink is promoted. Hence, when the dry oil is subsidiarily used in the ink according to this embodiment, the ink after recording is rapidly cured, and the oil-based medium contained in the ink is fixed in a recording medium. Accordingly, even when a record material is pinched by a clear folder, a remaining medium is suppressed from moving to the clear folder, and an oil-based recording liquid having an improved clear folder storage property can be provided.

In addition, the dry oil indicates an oil having an iodine value of 130 or more, and for example, a linseed oil, a wood oil, a mustard oil, a beefsteak plant oil, a walnut oil, a perilla oil, a safflower oil, or a sunflower oil may be mentioned. Those dry oils may be used alone, or at least two types thereof may be used in combination.

When the dry oil is contained, in view of the ink ejection property, the content thereof with respect to the total mass of the oil-based ink jet ink composition is preferably set to from 0.05 to 10 percent by mass.

1.2.5. Other Oil-Based Media

In the oil-based ink jet ink composition according to this embodiment, as the oil-based medium, besides the allyl compound, the second organic medium, and the dry oil, various known vegetable oils and/or petroleum solvents may be further contained, and a non-polar organic solvent and/or a polar organic solvent may also be used.

1.2.5.1. Non-Polar Organic Solvent

As the non-polar organic solvent to be used in the oil-based ink jet ink composition according to this embodiment, for example, a naphthene-based, a paraffin-based, or an isoparaffin-based hydrocarbon solvent, a fluorine-based surfactant, or a silicone-based surfactant may be mentioned. As those non-polar organic solvents, commercially available products may also be used. For example, as aliphatic saturated hydrocarbons, such as dodecane, Isopar or Exxsol (each manufactured by Exxon Mobile Corp.), AF Solvent or Normal Paraffin H (each manufactured by JX Nippon Oil & Energy Corporation), AS Sol (manufactured by Willve Co., Ltd.), Dust Clean (manufactured by Matsumura Oil Co., Ltd.), Sansen or Sunper (each manufactured by JAPAN SUN OIL COMPANY, LTD.), or Surflon (Manufactured by AGC Seimi Chemical Co., Ltd.).

1.2.5.2. Polar Organic Solvent

As the polar organic solvent to be used in the oil-based ink jet ink composition according to this embodiment, for example, there may be mentioned an ester-based solvent, an alcohol-based solvent, an amide-based solvent, a fatty acid-based solvent, and an ether-based solvent may be mentioned.

As the ester-based solvent, there may be mentioned a higher fatty acid ester having at least 5 carbon atoms in its molecule, preferably at least 9 carbon atoms in its molecule, and more preferably 12 to 32 carbon atoms in its molecule. For example, there may be used isodecyl isononanoate, isotridecyl isononanoate, isononyl isononanoate, methyl laurate, isopropyl laurate, isopropyl myristate, isopropyl palmitate, isooctyl palmitate, hexyl palmitate, isostearyl palmitate, isooctyl isopalmitate, methyl oleate, ethyl oleate, isopropyl oleate, butyl oleate, hexyl oleate, methyl linoleate, isobutyl linoleate, ethyl linoleate, butyl stearate, hexyl stearate, isooctyl stearate, isopropyl iosstearate, 2-octyldodecyl pivalate, diisopropyl adipate, diisopropyl sebacate, diethyl sebacate, propylene glycol monocaprylate, trimethylolpropane tri-2-ethylhexanate, or glycerin tri-2-ethylhexanate. In addition, a soy bean-oil fatty acid methyl ester, a soy bean-oil fatty acid isobutyl ester, a tall-oil fatty acid methyl ester, or a tall-oil fatty acid isobutyl ester, each of which is an ester of a dry oil fatty acid and an alcohol, may also be used.

As the alcohol-based solvent, a higher fatty acid alcohol having at least 12 carbon atoms in its molecule may be mentioned, and for example, a higher alcohol, such as isomyristyl alcohol, isopalmitic alcohol, isostearyl alcohol, or oleic alcohol, may be mentioned.

As the amide-based solvent, for example, acetamide, dimethylacetamide, or N-methylpyrrolidone, may be mentioned.

As the fatty acid-based solvent, a fatty acid having at least 4 carbon atoms in its molecule and preferably having 9 to 22 carbon atoms in its molecule may be mentioned, and for example, isononanoic acid, isomyristyl acid, hexadecane acid, isopalmitic acid, oleic acid, or isostearic acid may be mentioned.

As the ether-based solvent, for example, besides a glycol ether, such as diethylene glycol monobutyl ether, ethylene glycol monobutyl ether, propylene glycol monobutyl ether, and propylene glycol dibutyl ether, an acetate of a glycol ether may be mentioned.

The content of the other oil-based media is with respect to the total mass (100 percent by mass) of the ink composition, preferably 15 percent by mass or less and more preferably 10 percent by mass or less.

1.3. Metal Soap and Metal Complex

The oil-based ink jet ink composition according to this embodiment preferably contains at least one type selected from the group consisting of a metal soap and a metal complex. In the oil-based ink jet ink composition according to this embodiment, the metal soap and the metal complex are each also called a drier (curing promoter) and each function as an oxidizing agent which promotes the oxidation polymerization of the organic compound contained in the oil-based medium. Hence, when recording is performed on a recording medium, such as paper, using the oil-based ink jet ink composition according to this embodiment, the ink after recording is rapidly cured, and the oil-based medium contained in the ink is fixed in the recording medium. As a result, even when a record material is pinched by a clear folder, the oil-based medium is suppressed from moving to the clear folder, and the deformation thereof is prevented.

In this embodiment, a metal contained in the metal soap or the metal complex may be at least one type selected from the group consisting of Co (cobalt), Mn (manganese), Pb (lead), Zr (zirconium), Ca (calcium), Ba (barium), K (potassium), and Fe (iron). In this embodiment, the metal soap or the metal complex is an organic acid metal salt. As an organic acid used as a raw material of the organic acid metal salt, any organic acid which has been used as a general raw material of a related dryer may be used without any particular restriction. In particular, for example, an organic acid, such as propionic acid, octylic acid, naphthenic acid, neodecanoic acid, wood oil acid, linseed oil acid, soybean oil acid, or resin acid may be used. However, in order to obtain an excellent drying promotion effect, an aliphatic monocarboxylic acid having 3 to 12 carbon atoms is preferably used, and octylic acid, naphthenic acid, or neodecanoic acid is more preferably used. Those acids may be used alone, or at least two types thereof may be used in combination.

Among compounds (metal salts) containing those metals, for example, cobalt or the like promotes the oxidation at the interface between an ink coating film and the air, and other metals, such as manganese, having a moderate function perform not only surface oxidation but also inside oxidation so as to promote the entire polymerization. Although the subsidiary drier, such as zirconium or calcium, improves comprehensive performance in combination with the drier described above, the subsidiary drier itself hardly has the effect.

As the organic acid metal salt to be used in this embodiment, for example, the organic acid metal salt represented by the formula (A) may be mentioned.

$$(OMR)_3 \qquad \text{Formula (A)}$$

In the above formula, M represents a cobalt atom or a manganese atom, R represents an organic acid group, and three R in the molecule may be equivalent to or different from each other.

In the above formula (A), the organic acid group R is a carboxylate group of an organic acid, such as propionic acid, octylic acid, naphthenic acid, neodecanoic acid, wood oil acid, linseed oil acid, soybean oil acid, or resin acid, is preferably a carboxylate group of an aliphatic monocarboxylic acid having 3 to 12 carbon atoms, and is more preferably a carboxylate group of octylic acid, naphthenic acid, or neodecanoic acid.

As described above, in this embodiment, although a cobalt drier or a manganese drier has been mentioned as the metal soap or the metal complex, in view of the use environment, a manganese drier is preferably used. In addition, since manganese has a low activity as compared to that of cobalt, when a manganese drier is used, a ligand which activates the manganese drier is preferably used together therewith. As the ligand, for example, 2,2'-bipyridine, 2-(aminomethyl)pyridine, or 2-hydroxymethylpyridine may be mentioned. The ligands may be used alone, or at least two types thereof may be used in combination.

As the manganese drier, manganese neodecanoate is preferably used, and as a commercially available product, for example, DICNATE Mn6.5% SB manufactured by DIC Corp. may be mentioned.

As the organic acid metal salt to be used as another drier, an organic acid cobalt boron metal salt and an organic acid manganese boron metal salt may be mentioned. Although those organic acid metal salts may be used alone or in combination, when a coating film having a large thickness is dried, the above organic acid metal salts are preferably used in combination. The reason for this is that when a thick film is dried, although uniform curing thereof is generally difficult to be performed, because of excellent drying property obtained by the combination described above, curing can be uniformly performed. Furthermore, as is the case described above, since the drying property of a thick coating film is excellent, the organic acid cobalt boron metal salt and the organic acid manganese boron metal salt are preferably used in combination with an organic acid manganese metal salt. In addition, since a low-price drier excellent in drying promotion effect is obtained, the organic acid cobalt boron metal salt and the organic acid manganese metal salt are particularly preferably used in combination.

Although a method for manufacturing an organic acid metal salt to be used in the invention is not particularly limited, a manufacturing may be performed using a known method, and for example, by a method disclosed in JP-A-63-63551, manufacturing may be performed.

In addition, in view of handling easiness and uniform mixing property, those organic acid metal salts are each preferably diluted in advance with an organic medium before being added to the oil-based ink jet ink composition. As the organic medium used for dilution, any media may be used as long as uniformly dissolving the above organic acid metal salt and being inert thereto, and for example, there may be used a hydrocarbon-based solvent, such as toluene, xylene, heptane, hexane, cyclohexane, or mineral spirit; an alcohol-based solvent, such as methanol, ethanol, propanol, or cyclohexanol; a ketone-based solvent, such as methyl ethyl ketone, methyl isobutyl ketone, or cyclohexanone; an ether-based solvent, such as propyl ether, methyl cellosolve, cellosolve, butyl cellosolve, methyl carbitol, or butyl carbitol. Those solvents may be used alone, or at least two types thereof may be used in combination.

1.4. Other Components

To the oil-based ink jet ink composition according to this embodiment, other additives which are contained in a general oil-based ink jet ink composition may also be added. As the other additives, for example, a stabilizer, such as an antioxidant or a UV absorber, a binder resin, and the like may be mentioned.

As the antioxidant, for example, BHA (2,3-butyl-4-oxyanisol) or BHT (2,6-di-t-butyl-p-cresol) may be mentioned.

As the UV absorber, for example, a benzophenone-based compound or a benzotriazole-based compound may be mentioned.

To the oil-based ink jet ink composition according to this embodiment, in order to adjust the viscosity of the ink, a binder resin may be added. As the binder resin, for example, a fiber-based resin, such as an acrylic resin, a styrene-acrylic resin, a rosin modified resin, a phenol resin, a terpene resin, a polyester resin, a polyamide resin, an epoxy resin, a vinyl chloride-acetic acid resin, a vinyl copolymer resin, or a cellulose acetate butyrate resin; or a vinyltoluene-α-methylstyrene copolymer resin may be mentioned. Those binder resins may be used alone, or at least two types thereof may be used in combination.

1.5. Method for Manufacturing Oil-Based Ink Jet Ink Composition

The oil-based ink jet ink composition according to this embodiment may be manufactured by a known common method. When a pigment is used as the color material, first, after the pigment, the dispersant, and the organic solvent (part thereof) are mixed together, a pigment dispersion liquid is prepared by a ball mill, a bead mill, an ultrasonic mill, a jet mill, or the like so as to obtain desired ink characteristics. Subsequently, the organic solvent (remaining part) and the other additives (such as the surfactant and the binder resin) are added with stirring, so that the oil-based ink jet ink composition can be obtained.

1.6. Physical Properties

In view of the balance between the recording quality and the reliability as the ink jet ink composition, the surface tension of the oil-based ink jet ink composition according to this embodiment is preferably from 20 to 50 mN/m, and more preferably from 25 to 40 mN/m. In addition, the measurement of the tensile tension is performed using an automatic surface tension meter CBVP-Z (manufactured by Kyowa Interface Science Co., Ltd.) by confirmation of the surface tension obtained when a platinum plate is wetted with an ink at an environmental temperature of 20° C.

In addition, in view of the balance similar to that described above, the viscosity of the oil-based ink jet ink composition according to this embodiment at 20° C. is preferably from 2 to 30 mPa·s and more preferably from 2 to 20 mPa·s. In addition, the measurement of the viscosity is performed using a viscoelastic tester MCR-300 (manufactured by Pysica) in such a way that at an environmental temperature of 20° C., while the shear rate is increased from 10 to 1,000, and the viscosity at a shear rate of 200 is measured.

1.7. Applications

After the oil-based ink jet ink composition according to this embodiment is received in an ink cartridge of a known ink jet recording device, an ink droplet is ejected therefrom, and the droplet is adhered to a recording medium, such as paper, so that an image is recorded. As the ink jet recording device, an ink jet recording device is preferably configured such that an electrostrictive element capable of vibrating in accordance with an electric signal is mounted, and ink is ejected by the vibration of the above electrostrictive element. In the ink jet ink composition according to this embodiment, as the oil-based medium, since the content of the first organic medium having an SP value of 9.5 or more and an iodine value of 120 or more is 50 percent by mass or more, or the oil-based medium contains the allyl compound, recording of an image can be performed without generating any ink ejection problems. In addition, a record material obtained by using the ink jet ink composition according to this embodiment is able to suppress a clear folder from being deformed by the influence of a medium remaining in an obtained image.

As described above, according to the oil-based ink jet ink composition of this embodiment, in the oil-based medium, since the content of the first organic medium having an SP value of 9.5 or more and an iodine value of 120 or more is 50 percent by mass or more, or since the oil-based medium contains the allyl compound, an oil-based recording liquid which can suppress for a long period of time, a clear folder from being deformed by a printed matter formed by using this ink.

2. Examples

Hereinafter, although the invention will be described in detail with reference to experimental examples and comparative examples, the invention is not limited to those examples.

2.1. Preparation of Oil-Based Ink Composition

In each of Examples 1 to 13 and Comparative Example 1, after individual raw material were fully dissolved to each other by mixing and stirring so as to obtain the composition (percent by mass) shown in the following Table 1, filtration was performed using a membrane filter having a pore size of 1 μm, so that individual oil-based ink compositions were obtained. Subsequently, the following evaluation test of clear folder deformation was performed on each oil-based ink composition.

As Example 14, after 5,000 g of a medium 1, 500 g of a linseed oil, 500 g of a pigment 1, and 300 g of a dispersant were received in a 10-L stainless steel container, this mixture was stirred for 1 hour using a Dissolver manufactured by Inoue MFG. Inc., so that a mill base was manufactured. By the use of a Star Mill LMZ (circumferential velocity: 12 m/s, used beads: zirconia beads having a diameter of 0.1 mm, bead packing rate: 85%) manufactured by Ashizawa Finetech Ltd., five pass dispersion treatments were performed in accordance with the pass operation. Subsequently, by the use of a refrigerated centrifugal machine (CR7N) manufactured by Hitachi Koki, Co., Ltd., a centrifugal separation treatment was performed for 20 minutes at an accelerating rate of 11,000 G, and next, filtration was then performed using a 3-μm filter. Subsequently, after 3,600 g of the medium 1 was added to the filtrate, stirring was sufficiently performed, so that an oil-based ink composition of Example 14 was obtained.

In Example 15, except that in the method for manufacturing an oil-based ink of Example 14, the pigment 1 was changed to the pigment 2, an ink of Example 15 was manufactured under conditions similar to those in Example 14.

In Example 16, except that in the method for manufacturing an oil-based ink of Example 14, the medium 1 was changed to the medium 3, an ink of Example 16 was manufactured under conditions similar to those in Example 14.

In Example 17, except that in the method for manufacturing an oil-based ink of Example 14, the medium 1 was changed to the medium 3, and the pigment 1 was changed to the pigment 2, an ink of Example 17 was manufactured under conditions similar to those in Example 14.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Medium 1 | 69 | 0 | 0 | 0 | 94 | 0 | 0 | 0 | 93 |
| Medium 2 | 0 | 69 | 0 | 0 | 0 | 94 | 0 | 0 | 0 |
| Medium 3 | 0 | 0 | 99 | 0 | 0 | 0 | 94 | 0 | 0 |
| Medium 4 | 0 | 0 | 0 | 98 | 0 | 0 | 0 | 94 | 0 |
| Medium 5 | 30 | 30 | 0 | 0 | 0 | 0 | 0 | 0 | 0 |
| Dry oil | 0 | 0 | 0 | 0 | 5 | 5 | 5 | 5 | 5 |
| Mn Soap | 0 | 0 | 0 | 1 | 0 | 0 | 0 | 0 | 1 |
| Oil soluble dye | 1 | 1 | 1 | 1 | 1 | 1 | 1 | 1 | 1 |
| Pigment 1 | 0 | 0 | 0 | 0 | 0 | 0 | 0 | 0 | 0 |
| Pigment 2 | 0 | 0 | 0 | 0 | 0 | 0 | 0 | 0 | 0 |
| Dispersant | 0 | 0 | 0 | 0 | 0 | 0 | 0 | 0 | 0 |
| Clear folder storage property | 3 | 3 | 3 | 3 | 4 | 4 | 4 | 4 | 5 |
| Ejection stability | 4 | 4 | 4 | 4 | 4 | 4 | 4 | 4 | 4 |

|  | Example 10 | Example 11 | Example 12 | Example 13 | Example 14 | Example 15 | Example 16 | Example 17 | Comparative Example 1 |
|---|---|---|---|---|---|---|---|---|---|
| Medium 1 | 0 | 0 | 0 | 58 | 86 | 86 | 0 | 0 | 45 |
| Medium 2 | 93 | 0 | 0 | 0 | 0 | 0 | 0 | 0 | 0 |
| Medium 3 | 0 | 93 | 0 | 0 | 0 | 0 | 86 | 86 | 0 |
| Medium 4 | 0 | 0 | 93 | 0 | 0 | 0 | 0 | 0 | 0 |
| Medium 5 | 0 | 0 | 0 | 35 | 0 | 0 | 0 | 0 | 48 |
| Dry oil | 5 | 5 | 5 | 5 | 5 | 5 | 5 | 5 | 5 |
| Mn Soap | 1 | 1 | 1 | 1 | 1 | 1 | 1 | 1 | 1 |
| Oil soluble dye | 1 | 1 | 1 | 1 | 0 | 0 | 0 | 0 | 1 |

TABLE 1-continued

|  |  |  |  |  |  |  |  |  |  |
|---|---|---|---|---|---|---|---|---|---|
| Pigment 1 | 0 | 0 | 0 | 0 | 5 | 0 | 5 | 0 | 0 |
| Pigment 2 | 0 | 0 | 0 | 0 | 0 | 5 | 0 | 5 | 0 |
| Dispersant | 0 | 0 | 0 | 0 | 3 | 3 | 3 | 3 | 0 |
| Clear folder storage property | 5 | 5 | 5 | 3 | 5 | 5 | 5 | 5 | 1 |
| Ejection stability | 4 | 4 | 4 | 4 | 3 | 3 | 3 | 4 | 4 |

In addition amount, in Table 1, the materials not designated by the compound name are as follows.

Medium 1: Allyl Ether A (SP value: 12.6, Iodine value: 297): manufactured by Osaka Soda Co., Ltd., Neoallyl (registered trade name) P-30

Medium 2: Allyl Ether B (SP value: 11.5, Iodine value: 231):manufactured by Osaka Soda Co., Ltd., Neoallyl (registered trade name) T-20

Medium 3: Linseed oil fatty acid 2-ethylhexyl
  2-ethylhexyl linolenate (SP value: 9.5, Iodine value: 195) 61%
  2-ethylhexyl oleate (SP value: 8.6, Iodine value: 64) 14%
  2-ethylhexyl linoleate (SP value: 8.5, Iodine value: 129) 15%
  2-ethylhexyl palmitate (SP value: 8.5, Iodine value: 0) 7%
  2-ethylhexyl stearate (SP value: 8.5, Iodine value: 0) 3%

Medium 4: linseed oil fatty acid methyl ester
  Methyl linolenate (SP value: 9.6, Iodine value: 267) 61%
  Methyl oleate (SP value: 8.6, Iodine value: 94) 14%
  Methyl linoleate (SP value: 8.6, Iodine value: 189) 15%
  Methyl palmitate (SP value: 8.6, Iodine value: 0) 7%
  Methyl stearate (SP value: 8.6, Iodine value: 0) 3%

Medium 5: Methyl oleate: manufactured by Toei Chemical Co., Ltd., TOENOL#2180; SP value: 8.6, Iodine value: 94

Dry oil: linseed oil, manufactured by Kaneda Co., Ltd.

Mn soap: DICNATE Mn6.5% SB, manufactured by DIC Corp.

Oil soluble dye: Neozapon Blue 807, manufactured by BASF

Pigment 1: Cinquasia Magenta D4550J (manufactured by BASF)

Pigment 2: Heliogen Blue D7088 (manufactured by BASF)

Dispersant: Solsperse 13940

After individual materials were fully dissolved with each other by mixing and stirring so as to obtain the composition (percent by mass) of each of Examples 18 to 29 and Comparative Examples 2 to 5 shown in the following Table 2, filtration was performed using a membrane filter having a pore size of 1 μm, so that individual oil-based ink compositions were obtained. Subsequently, the following evaluation test of clear folder deformation was performed on each of the oil-based ink compositions.

As Example 24, after 5,000 g of Allyl Ether A, 800 g of a linseed oil, 500 g of the pigment 1, and 300 g of the dispersant were received in a 10-L stainless steel container, this mixture was stirred for 1 hour using a Dissolver manufactured by Inoue MFG. Inc., so that a mill base was manufactured. By the use of a Star Mill LMZ (circumferential velocity: 12 m/s, used beads: zirconia beads having a diameter of 0.1 mm, bead packing rate: 85%) manufactured by Ashizawa Finetech Ltd., five pass dispersion treatments were performed in accordance with the pass operation. Subsequently, by the use of a refrigerated centrifugal machine (CR7N) manufactured by Hitachi Koki, Co., Ltd., a centrifugal separation treatment was performed for 20 minutes at an accelerating rate of 11,000 G, and next, filtration was then performed using a 3-μm filter. Subsequently, after 3,300 g of Allyl Ether A was added to the filtrate, stirring was sufficiently performed, so that an oil-based ink composition of Example 24 was obtained.

In Example 25, except that in the method for manufacturing an oil-based ink of Example 24, the pigment 1 was changed to the pigment 2, an ink of Example 25 was manufactured under conditions similar to those in Example 24.

In Example 26, except that in the method for manufacturing an oil-based ink of Example 24, Allyl Ether A was changed to Allyl Ether B, an ink of Example 26 was manufactured under conditions similar to those in Example 24.

In Example 27, except that in the method for manufacturing an oil-based ink of Example 24, Allyl Ether A was changed to Allyl Ether B, and the pigment 1 was changed to the pigment 2, an ink of Example 27 was manufactured under conditions similar to those in Example 24.

In Example 28, except that in the method for manufacturing an oil-based ink of Example 24, Allyl Ether A and the linseed oil were all changed to Allyl Ether C, an ink of Example 28 was manufactured under conditions similar to those in Example 24.

In Example 29, except that in the method for manufacturing an oil-based ink of Example 24, Allyl Ether A was changed to Allyl Ether C, an ink of Example 29 was manufactured under conditions similar to those in Example 24.

TABLE 2

|  | Example 18 | Example 19 | Example 20 | Example 21 | Example 22 | Example 23 | Example 24 | Example 25 |
|---|---|---|---|---|---|---|---|---|
| Ally ether A | 99 | 0 | 98 | 0 | 90 | 96 | 83 | 83 |
| Ally ether B | 0 | 99 | 0 | 96 | 0 | 0 | 0 | 0 |
| Ally ether C | 0 | 0 | 0 | 0 | 0 | 0 | 0 | 0 |
| Methyl oleate | 0 | 0 | 0 | 0 | 0 | 0 | 0 | 0 |
| Linseed oil | 0 | 0 | 0 | 0 | 8 | 0 | 8 | 8 |
| Wood oil | 0 | 0 | 0 | 0 | 0 | 2 | 0 | 0 |
| Mn soap | 0 | 0 | 1 | 3 | 1 | 1 | 1 | 1 |
| Oil soluble dye | 1 | 1 | 1 | 1 | 1 | 1 | 0 | 0 |

TABLE 2-continued

|  |  |  |  |  |  |  |  |  |
|---|---|---|---|---|---|---|---|---|
| Pigment 1 | 0 | 0 | 0 | 0 | 0 | 0 | 5 | 0 |
| Pigment 2 | 0 | 0 | 0 | 0 | 0 | 0 | 0 | 5 |
| Dispersant | 0 | 0 | 0 | 0 | 0 | 0 | 3 | 3 |
| Clear folder deformation | 3 | 3 | 4 | 4 | 5 | 5 | 5 | 5 |
| Ejection stability | 4 | 4 | 4 | 4 | 4 | 4 | 3 | 3 |

|  | Example 26 | Example 27 | Example 28 | Example 29 | Example 2 | Comparative Example 3 | Comparative Example 4 | Comparative Example 5 |
|---|---|---|---|---|---|---|---|---|
| Ally ether A | 0 | 0 | 0 | 0 | 0 | 0 | 0 | 0 |
| Ally ether B | 83 | 83 | 0 | 0 | 0 | 0 | 0 | 0 |
| Ally ether C | 0 | 0 | 91 | 83 | 0 | 0 | 0 | 0 |
| Methyl oleate | 0 | 0 | 0 | 0 | 99 | 98 | 93 | 90 |
| Linseed oil | 8 | 8 | 0 | 8 | 0 | 0 | 0 | 8 |
| Wood oil | 0 | 0 | 0 | 0 | 0 | 0 | 5 | 0 |
| Mn soap | 1 | 1 | 1 | 1 | 0 | 1 | 1 | 1 |
| Oil soluble dye | 0 | 0 | 0 | 0 | 1 | 1 | 1 | 1 |
| Pigment 1 | 5 | 0 | 5 | 5 | 0 | 0 | 0 | 0 |
| Pigment 2 | 0 | 5 | 0 | 0 | 0 | 0 | 0 | 0 |
| Dispersant | 3 | 3 | 3 | 3 | 0 | 0 | 0 | 0 |
| Clear folder deformation | 5 | 5 | 4 | 5 | 1 | 1 | 1 | 1 |
| Ejection stability | 3 | 3 | 5 | 4 | 4 | 4 | 4 | 4 |

In addition, in Table 2, the materials not designated by the compound name are as follows.

Allyl Ether A: Neoallyl (registered trade name) P-30, manufactured by Osaka Soda Co., Ltd.

Allyl Ether B: Neoallyl (registered trade name) T-20, manufactured by Osaka Soda Co., Ltd.

Allyl Ether C: Neoallyl (registered trade name) P-40, manufactured by Osaka Soda Co. Ltd.

Methyl Oleate: TOENOL#2180, manufactured by Toei Chemical Co., Ltd.

Linseed Oil: manufactured by Kaneda Co., Ltd.

Wood oil: manufactured by Kaneda Co., Ltd.

Mn Soap: DICNATE Mn6.5% SB, manufactured by DIC corp.

Oil Soluble Dye: Neozapon Blue 807, manufactured by BASF

Pigment 1: Cinquasia Magenta D4550J, manufactured by BASF

Pigment 2: Heliogen Blue D7088, manufactured by BASF

Dispersant: Solsperse 13940

2.2. Evaluation Test of Clear Folder Deformation

After the oil-based ink compositions thus obtained were each filled in an ink cartridge of a modified ink jet printer PX-M7050F (manufactured by Seiko Epson Corp.), solid printing (rectangular shape of 20 cm by 28 cm) was performed on double-sided high-quality normal paper (manufactured by Seiko Epson Corp.), and a printed matter was inserted into a PP-made clear folder. The clear folder into which the printed matter was inserted was still held flatly for 30 days under 23° C./50% R.H. conditions. Subsequently, the outside warpage of the clear folder thus held was measured using a scale, and the value thus obtained was evaluated as the deformation amount. The evaluation results were ranked in accordance with the following criteria.

5: Deformation amount of less than 10 mm.
4: Deformation amount of from 10 to less than 30 mm.
3: Deformation amount of from 30 to less than 50 mm.
2: Deformation amount of from 50 to less than 150 mm.
1: Deformation amount of 150 mm or more.

2.3. Evaluation of Ejection Stability

After the oil-based recording liquid composition thus obtained was filled in an ink cartridge of a modified ink jet printer PX-M7050F (manufactured by Seiko Epson Corp.), a test pattern (A4) including letters and one dot-type ruled lines (in vertical and horizontal directions) was continuously printed on 1,000 sheets, and the quality thereof was evaluated by visual inspection. The evaluation results were ranked in accordance with the following criteria.

5: Defect rate of less than 0.1%.
4: Defect rate of from 0.1% to less than 1%.
3: Defect rate of from 1% to less than 5%.
2: Defect rate of from 5% to less than 10%.
1: Defect rate of 10% or more.

2.4. Evaluation Results

The evaluation results of Examples 1 to 13 and Comparative Example 1 are shown in the bottom-most column of Table 1. In Examples 1 to 13 in each of which the content of the organic medium having an SP value of 9.5 or more and an iodine value of 120 or more was 50 percent by mass or more, the deformation amount was small. In particular, in Examples 5 to 8 in each of which the dry oil was further contained, and in Examples 9 to 12 in each of which the dry oil and the Mn soap were both contained, the deformation amount was reduced to less than 10 mm, and the clear folder storage property was improved. In Example 13 in which the content of the organic medium having an SP value of 9.0 or less and an iodine value of 100 or less was 30 percent by mass or less, although the deformation amount was large even when the dry oil and the Mn soap were both contained, the ink could be used without causing any particular problems. In addition, also in Examples 14 to 17 in each of which the dry oil and the dispersant were both contained, the effect similar to that described above could be obtained. On the other hand, in Comparative Example 1 in which the content of the organic medium having an SP value of 9.5 or more and an iodine value of 120 or more was less than 50 percent by mass, and the content of the organic medium having an SP value of 9.0 or less and an iodine value of 100 or less was more than 30 percent by mass, although the dry oil and the Mn soap were both contained, the deformation amount was large, and the clear folder storage property was inferior.

As described above, it was found that an oil-based recording liquid can be provided in which since the content of the organic medium having an SP value of 9.5 or more and an iodine value of 120 or more is 50 percent by mass or more, the deformation of the clear folder can be significantly suppressed, and furthermore, by addition of the Mn soap and the dry oil, the deformation of the clear folder caused by a printed matter formed of an oil-based ink can be suppressed for a long-period of time.

The evaluation results of Examples 18 to 29 and Comparative Examples 2 to 5 are shown in the bottom-most column of Table 2. In Examples 18, 19, and 28 in each of which the allyl compound was contained, the deformation amount was small as compared to that of Comparative Example 2 in which no allyl compound was contained. In addition, in Examples 20 and 21 in each of which the Mn soap was contained besides the allyl compound, the deformation amount was further decreased, and in Examples 22 and 23 in each of which the Mn soap and the dry oil were both further contained, the deformation amount was reduced to less than 10 mm, and the clear folder storage property was improved. In addition, also in Examples 24 to 27 and 29 in each of which the dry oil and the dispersant were contained, the effect similar to that described above was also confirmed. On the other hand, in the comparative examples in each of which no allyl compound was contained, although the Mn soap and the dry oil were both added, the deformation amount was large, and the clear folder storage property was inferior.

As described above, it was found that an oil-based recording liquid can be provided in which since the oil-based recording liquid contains the allyl compound, the deformation of the clear folder can be significantly suppressed, and since the Mn soap and the dry oil are further added, the deformation of the clear folder caused by a record material formed of an oil-based ink can be suppressed for a long-period of time.

The invention is not limited to the embodiments described above and may be variously changed and modified. For example, the invention includes substantially the same configuration (such as the configuration having the same function, method, and result, or the configuration having the same purpose and effect) as that described in the embodiments. In addition, the invention includes the configuration in which at least one nonessential of the configuration described in the embodiments is replaced. In addition, the invention includes the configuration which achieves the same function/effect or the same purpose as that of the configuration described in the embodiments. In addition, the invention includes the configuration formed by the addition of a known technique to the configuration described in the embodiments.

The entire disclosures of Japanese Patent Application Nos. 2015-215559, filed Nov. 2, 2015 and 2015-215560, filed Nov. 2, 2015 and 2016-170572, filed Sep. 1, 2016 are expressly incorporated by reference herein.

What is claimed is:
1. An oil-based recording liquid, comprising:
a color material; and
an oil-based medium,
wherein the oil-based medium contains a first organic medium having an SP value of 9.5 or more and an iodine value of 120 or more,
the content of the first organic medium is 50 percent by mass or more, and
the content of a second organic medium having an SP value of 9.0 or less and an iodine value of 100 or less, in the oil-based recording liquid is 30 percent by mass or less.

2. The oil-based recording liquid according to claim 1, further comprising at least one type of drier selected from the group consisting of a metal soap and a metal complex.

3. The oil-based recording liquid according to claim 2, wherein a metal of the metal soap or the metal complex is at least one selected from the group consisting of Co, Mn, Pb, Zr, Ca, Ba, K, and Fe.

4. The oil-based recording liquid according to claim 1, wherein the oil-based medium further contains a dry oil.

5. The oil-based recording liquid according to claim 1, wherein the oil-based recording liquid is used for ink jet recording.

6. An oil-based recording liquid, comprising:
a color material; and
an oil-based medium;
wherein the oil-based medium contains an allyl compound and a dry oil,
wherein the allyl compound is a compound represented by the following formula (1)

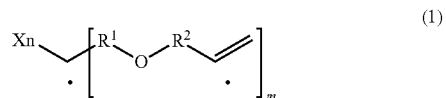

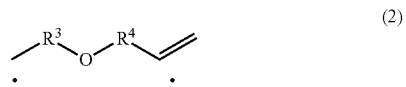

wherein in the formula (1), $R^1$ and $R^2$ each independently represent an alkyl chain having 1 to 3 carbon atoms, $X_n$ represents hydrogen, a hydroxyl group, an alkyl group having 1 to 6 carbon atoms, an alkylol group having 1 to 3 carbon atoms, or an allylalkoxy alkyl group represented by a formula (2),
m represents an integer of 1 to 3, and n represents an integer which satisfies m+n=4, and
$R^3$ and $R^4$ each independently represent an alkyl chain having 1 to 3 carbon atoms.

7. The oil-based recording liquid according to claim 6, further comprising at least one type of drier selected from the group consisting of a metal soap and a metal complex.

8. The oil-based recording liquid according to claim 6, wherein the oil-based recording liquid is used for ink jet recording.

* * * * *